United States Patent
Ur Rahman et al.

(10) Patent No.: US 7,790,016 B2
(45) Date of Patent: Sep. 7, 2010

(54) INTEGRATED ELECTROLYTIC-ELECTRODIALYTIC APPARATUS AND PROCESS FOR RECOVERING METALS FROM METAL ION-CONTAINING WASTE STREAMS

(75) Inventors: Sleem Ur Rahman, Dhahran (SA); Nabil Salem Abo-Gander, Vancouver (CA); Syed Mohammad Javaid Zaidi, Dhahran (SA)

(73) Assignee: King Fahd University of Petroleum and Minerals (SA)

(*) Notice: Subject to any disclaimer, the term of this patent is extended or adjusted under 35 U.S.C. 154(b) by 927 days.

(21) Appl. No.: 11/098,520

(22) Filed: Apr. 5, 2005

(65) Prior Publication Data
US 2006/0219574 A1  Oct. 5, 2006

(51) Int. Cl.
*C02F 1/46* (2006.01)

(52) U.S. Cl. .......... 205/748; 205/749; 205/750
(58) Field of Classification Search .......... 205/748, 205/749, 750; 204/529, 257, 633
See application file for complete search history.

(56) References Cited

U.S. PATENT DOCUMENTS 4,728,402 A * 3/1988 Prior .......... 205/581
4,976,832 A * 12/1990 Boateng .......... 205/349

* cited by examiner

*Primary Examiner*—Arun S Phasge
(74) *Attorney, Agent, or Firm*—Lowe Hauptman Ham & Berner, LLP

(57) ABSTRACT

An apparatus and method for the electrolytic and electrodialytic removal of metal ions from wastewater in a single cell. A battery of cells, each of which consists of a cathode, anode, anion exchange membrane and cation exchange membrane, is used. The battery of cells may be used in both batch and continuous processes, and is capable of reducing metal ion concentration from thousand ppm to few ppm. It can be used to concentrate dilute acids as a by-product.

3 Claims, 4 Drawing Sheets

Schematic diagram showing battery of cells used in batch process

A possibility of integrating electrolytic and electrodialytic cells for metal recovery from wastewater Movement of ions and reaction in a single integrated cell Schematic diagram showing battery of cells used in batch process Schematic diagram showing battery of cells used in continuous process

INTEGRATED ELECTROLYTIC-ELECTRODIALYTIC APPARATUS AND PROCESS FOR RECOVERING METALS FROM METAL ION-CONTAINING WASTE STREAMS

FIELD OF THE INVENTION

The present invention relates to the removal and recovery of metal ions from wastewater streams, and more particularly to treatment systems which use electrochemical methods to treat wastewater.

DISCUSSION OF THE BACKGROUND

Wastewater effluents originating from metallurgical (e.g. electroplating, mining, metal finishing, etc.) and process (e.g. printing) industries contain heavy metals, such as arsenic, cadmium, copper, gold, nickel, and zinc. These effluents must therefore be adequately treated before being discharged into the water bodies to minimize the effect of the contaminating heavy metals on the environment, especially with regard to the potable water supply. Treatment methods for metal removal from wastewater include precipitation, ion exchange, reverse osmosis, electrolysis, and electrodialysis. With the exception of electrolysis, all of these methods generate sludge or concentrated streams which need further treatment. Electrolysis is capable of removing toxic metal ions, through electrodeposition of the metal ion in metallic form at the cathode, and is a very well studied technique. Review articles and cell design are given by Kuhn and Houghton[1], Robertson and Leudolph[2], O'Keefee and Ettel[3] and Weinginger[4]. The electrolytic process is mainly mass transfer controlled, and cell configuration that increases the mass transfer at the cathode improves the performance of the cell. For example, rotary drum[5], fluidized bed[6], flow through a porous electrode[7], gas-sparging cell[8], rotating cylinder electrode[9], bipolar trickle cell[10], rotating disc[11], and tumbling barrel[12-16] have demonstrated improved performance.

Despite the improved mass transfer shown in conventional systems, the electrolytic method becomes expensive when the concentration of the wastewater becomes low due to increased ohmic resistance. Under these conditions, hydrolysis becomes the dominant reaction, manifesting itself as a low current efficiency for metal deposition. One way of solving this problem is to add salt to increase the electrolyte conductivity. However, this results in an undesirable increase in the total dissolved salts in wastewater.

Electrodialysis uses a number of anion and cation exchange membranes held between two electrodes. This technique is capable of treating low concentration wastewater, but produces a concentrated stream that needs further treatment. The first patent on electrodialysis was awarded in 1976[17]. Electrodialysis has been used to treat seawater[18,19], to produce chemicals[20-22], to recover metal ions in the metal finishing and metallurgical industry[23-26], and to treat industrial wastewater[27-35].

It is attractive to integrate electrolytic and electrodialytic processes to treat wastewater of moderate concentration and to recover metals. One way of doing so is shown in FIG. 1, which shows a general concept for treating wastewater of moderate concentration and for recovering metal using integrated electrolytic and electrodialytic processes. The wastewater stream is fed to the electrodialytic cell in countercurrent fashion. As the wastewater passes through the cell, the cations (metal ions) and anions diffuse through the cation and anion exchange membranes, respectively. Consequently, one stream loses metal ions to the other.

The diluted stream is taken out as the treated wastewater, while the concentrated stream is sent to the electrolytic cell. The flow rate and area of exchange are designed so that the exiting concentrated stream has enough concentration so that it is treated easily in the electrolytic cell where the metal is recovered on the cathode. Optimal flow rate and area of exchange are easily calculated by a person of ordinary skill in the art. The residence time in the electrolytic cell is such that the concentration of the exiting stream is similar to the original wastewater and this stream is recycled to the electrodialytic cell. Optimal residence times are easily calculated by a person of ordinary skill in the art. The overall system is complex and the wastewater needs to be pumped back and forth between the two cells. Pumping will increase the operating cost of the system.

Accordingly, there remains a need for an efficient and cost effective apparatus and process for removing and recovering metal ions from wastewater streams using electrochemical methods, which overcome the aforementioned disadvantages.

SUMMARY OF THE INVENTION

It is, therefore, an object of the present invention to provide an efficient and cost effective integrated electrolytic-electrodialytic apparatus and process for recovering metals from wastewater streams. More specifically, the invention is capable of reducing metal ion concentration in wastewater from thousands of ppm to a few ppm, and can also be used to concentrate mineral acids. The invention can be used as either a batch process or a continuous process.

DESCRIPTION OF THE DRAWINGS

For a better understanding of the invention as well as other objects and further features thereof, reference is made to the following detailed description to be read in conjunction with the accompanying drawings, wherein.

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

DESCRIPTION OF THE INVENTION

Figure 1:
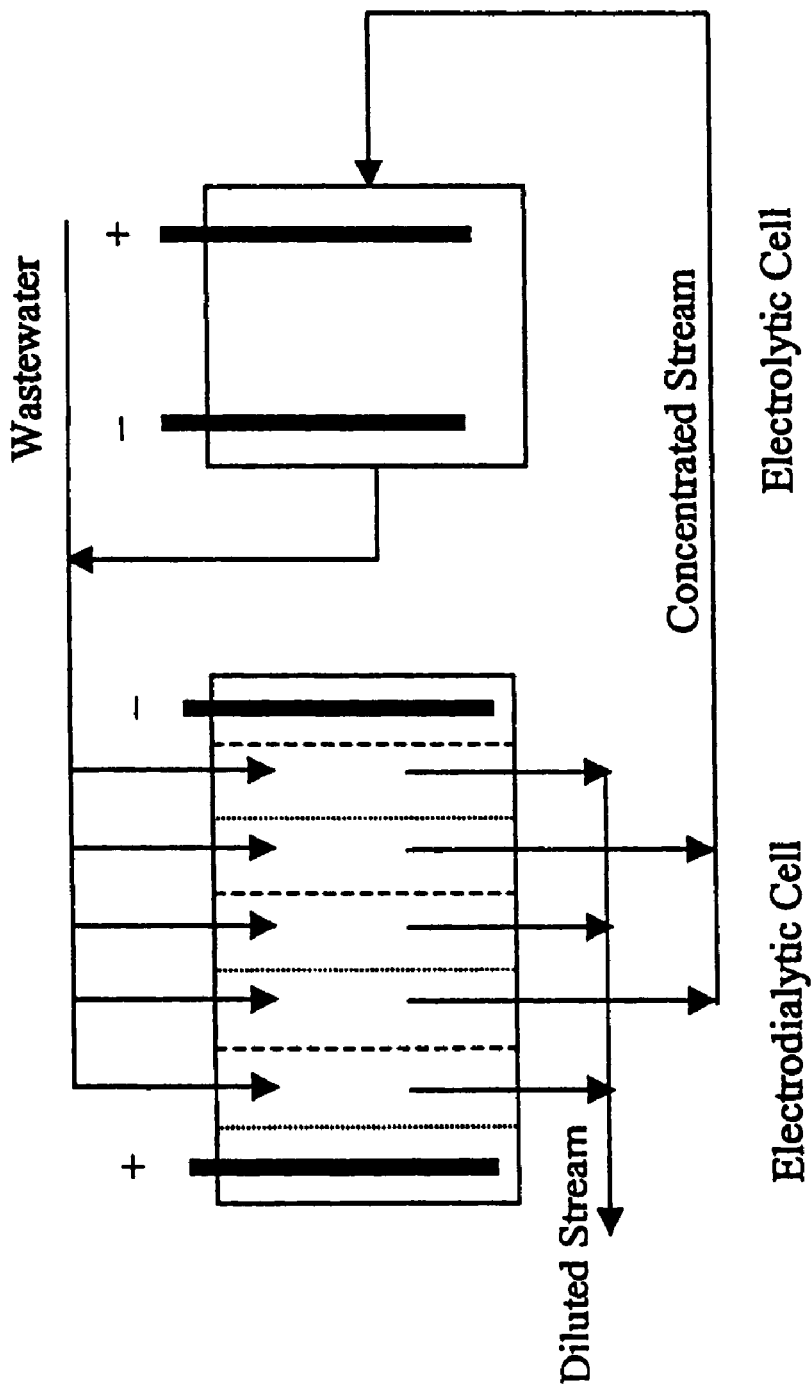
FIG. 1 shows a possibility of integrating electrolytic and electrodialytic cells for metal recovery from wastewater.
Figure 2:
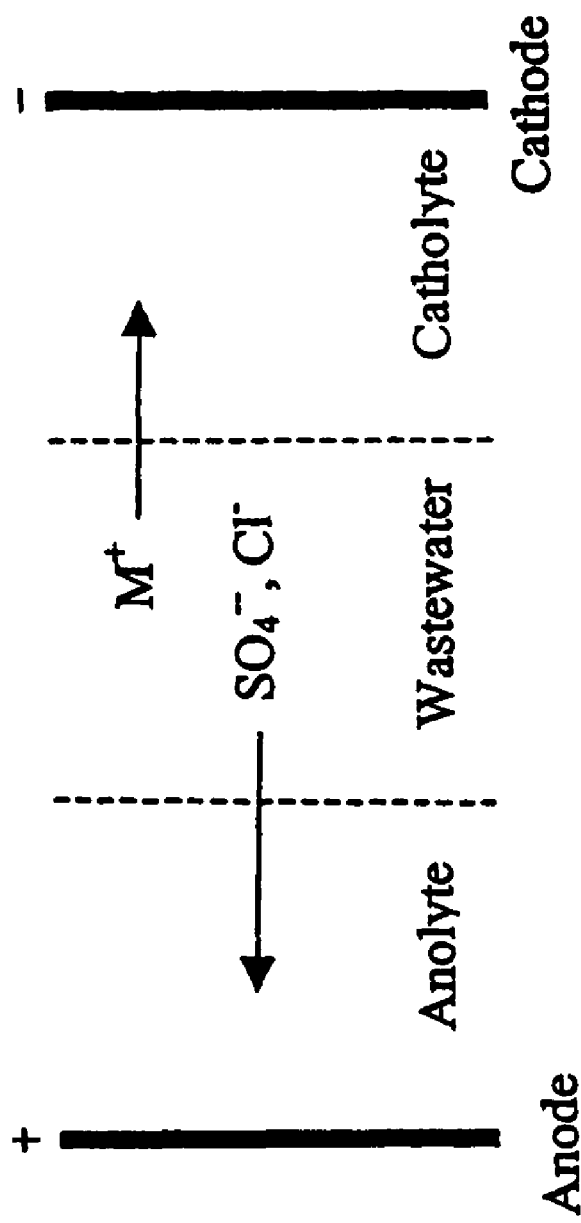
FIG. 2 shows the movement of ions and reaction in a single integrated cell.

The electrolysis and electrodialysis processes are integrated in one cell. FIG. 2 shows the movement of ions and reactions in an individual cell and a battery of integrated cells for continuous operation. Unlike an electrodialysis cell, each cell has a pair of electrodes and a pair of membranes (Tokuyama Corporation, South Korea). The membranes divide each cell into three compartments namely, anolyte, wastewater and catholyte compartments. When a potential is applied, the cations and anions diffuse through respective ion exchange membranes similar to an electrodialytic cell. However, the cation ions reach the cathode and reduce to metals:

$$M^{+n}(aq)+ne^-\rightarrow M(s) \tag{1}$$

Usually this reaction is accompanied by a hydrogen evolution reaction:

$$2H_2O+2e^-\rightarrow 2OH^-(aq)+H_2(g) \tag{2}$$

This is a side reaction and will take place if the potential is not maintained perfectly. The anions ($Cl^-$, and/or $SO_4^{-2}$) diffuse through the anion exchange membrane and reach the anode. At the anode, oxygen evolution reaction takes place:

$$2H_2O\rightarrow 4e^-+4H^+(aq)+O_2(g) \tag{3}$$

In order to reduce ohmic loses in the anolyte and catholyte, a diluted acid (e.g. HCl or $H_2SO_4$) and diluted base (e.g. KOH), respectively, can be used. As the process progresses, the concentrations of the anions and cations in the wastewater compartments decrease and the cations (metal ions) are recovered at the cathode. Also, the concentration of the $H^+$ and the anions ($Cl^-$, and/or $SO_4^{-2}$) in the anolyte compartment will increase. Therefore, the cell could be used to concentrate dilute acid as a by-product.

The integrated process is able to reduce the concentration of metal ions from thousands of ppm to few ppm in a single cell. The metal ions are recovered in valuable metallic form. Unlike the electrodialysis, this process does not produce any additional concentrated stream which would need further treatment. This process has better mass transfer across the cation membrane as the concentration difference across it is larger. Unlike electrolysis processes, it is not necessary to alter the hydrodynamics near cathode to increase mass transfer. In addition, the conductivity of the catholyte solution does not change with time. Also, the catholyte solution remains in the cell and is not discharged as effluent. Therefore the conductivity of the solution can be increased by adding a salt without any environmental problem in contrast to the electrolysis process.

Figure 3:
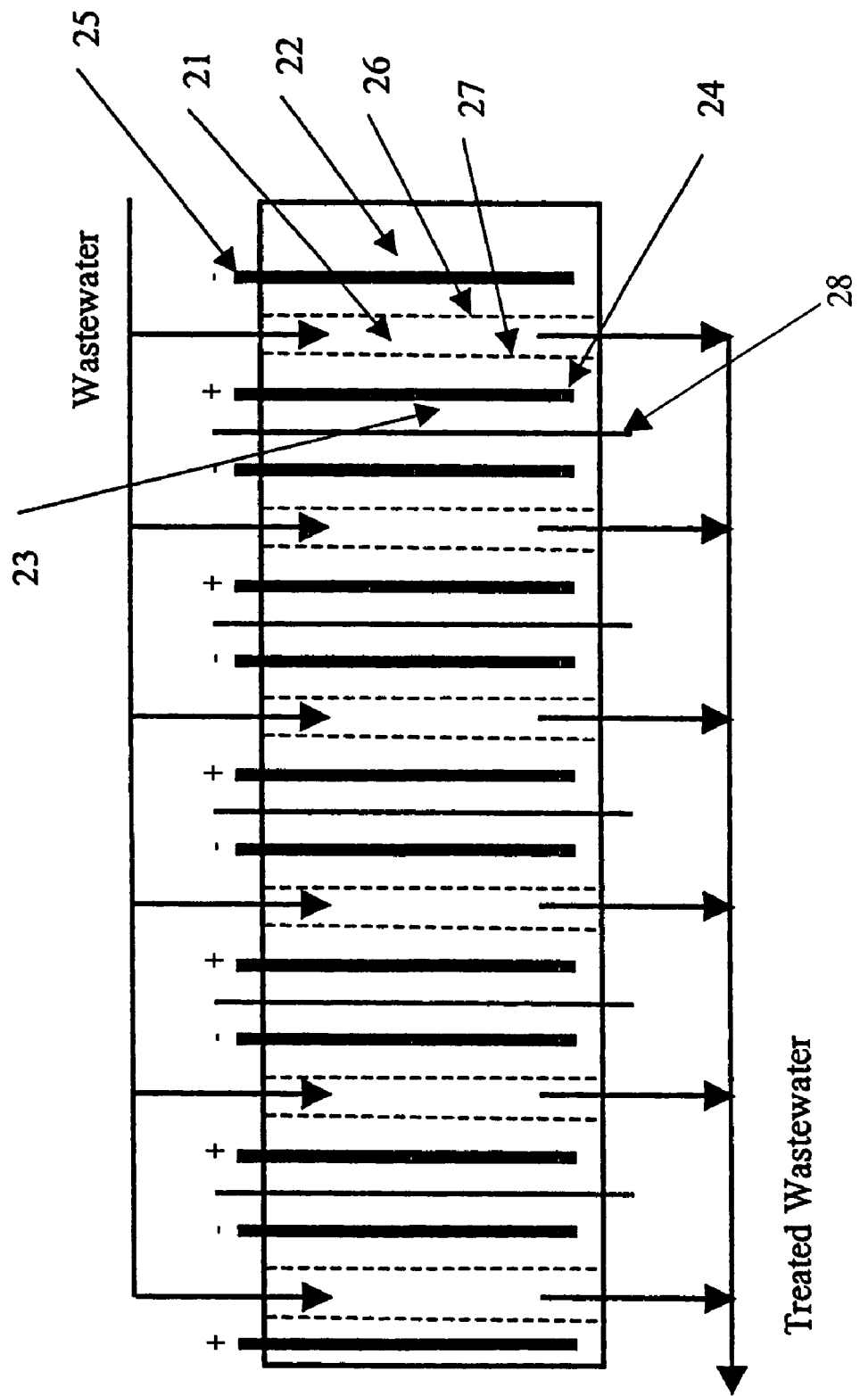
FIG. 3 shows a battery of cells used in a batch process.

A number of single cells can be combined to form a battery of integrated cells to accommodate larger quantities of wastewater as shown in FIG. 3. The continuous flow of wastewater can be treated in flow battery of integrated cells as shown in FIG. 4.

As mentioned earlier, FIG. 3 represents the batch system of the invention. It is mainly composed of three compartments designated as 21, 22, and 23 and referred to as wastewater compartment, catholyte compartment and anolyte compartment, respectively. The compartments are separated by two types of membrane, cation exchange membrane 26 and anion exchange membrane 27. The 22 and 23 compartments house a cathode 25 and an anode 24, respectively. The individual cells are separated from each other by an inert, non-porous and impermeable partition 28. Wastewater is filled in 21 compartments while 22 and 23 compartments are filled with a dilute acid and a salt solution of high conductivity, respectively. When a potential difference across the electrodes is applied, the cations in the compartment 21 will diffuse through the cation exchange membrane 26. On the other hand, the anions will diffuse through the anion exchange membrane 27. The concentration of acid in anolyte compartment 23, increases with time. The metal ions diffuse through 26 and reduced to metallic form on 25. Hydrogen is also generated on 25 as a by-product.

Figure 4:
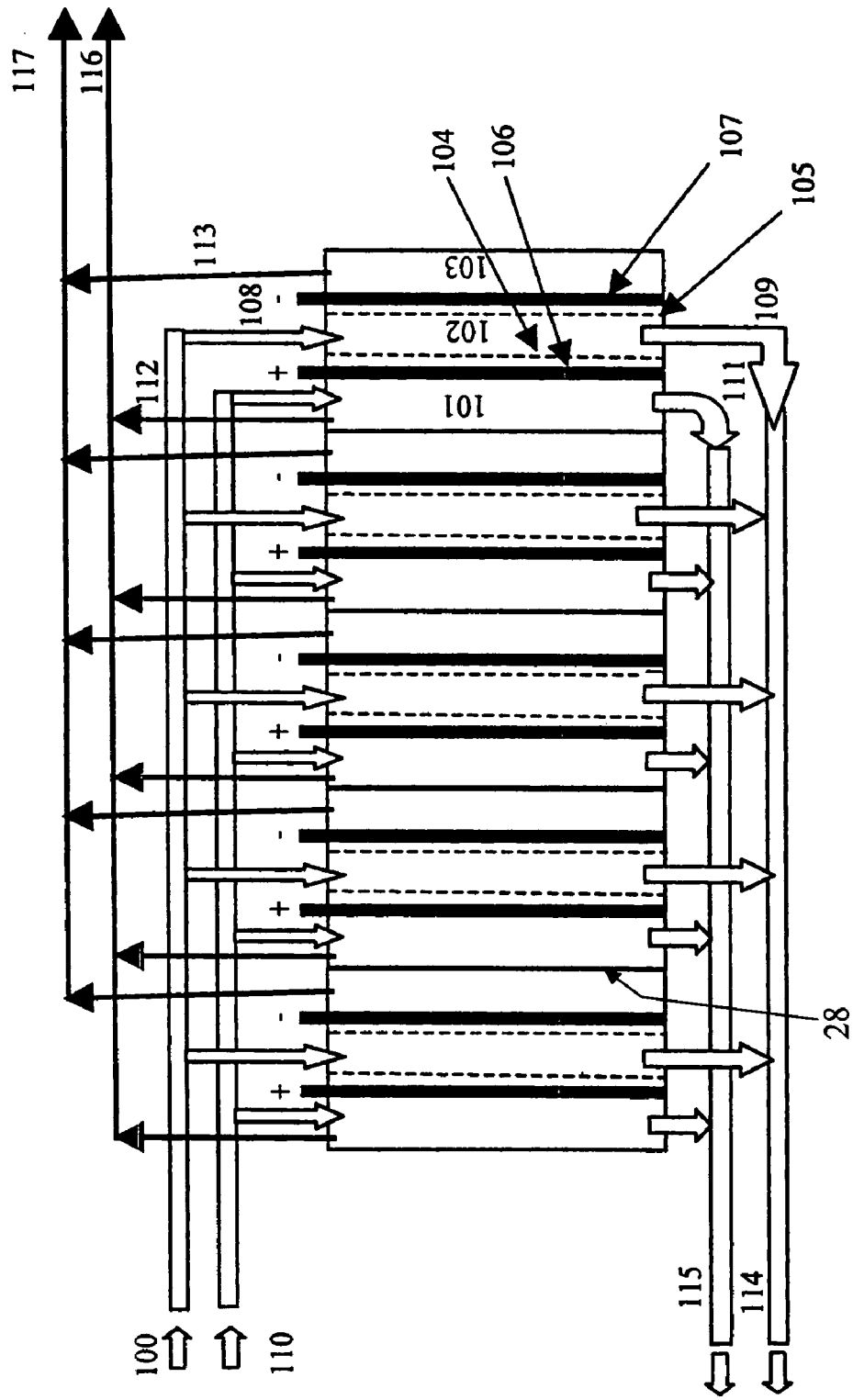
FIG. 4 shows a battery of cells used in a continuous process.

FIG. 4 represents the flow system of this invention. It is a battery of single flow cells. Each flow cells is made up of three compartments, namely, catholyte compartment 101, wastewater compartment 102 and anolyte compartment 103. An anion exchange membrane 104 separates 101 and 102 while a cation exchange membrane 105 separates 102 and 103. Compartments 101 and 103 house anode 106 and cathode 107, respectively. Wastewater stream 100 is divided into several streams so that it can be fed to all cells. In an individual cell, wastewater enters 102 via inlet 108 and leaves from outlet 109. The anolyte compartment receives diluted acid through 110. This acid gets concentrated and leaves from outlet 111. Oxygen which is produced on anode leaves the cell from 112 while the hydrogen that is produced at cathode leaves from 113. Stream 114 combines all effluent wastewater from all the cells of the battery. Similarly, streams 115, 116 and 117 combine respectively all concentrated acid, oxygen and hydrogen from the cells.

A preferred embodiment has been described in detail and a number of alternatives have been considered. As changes in or additions to the above-described embodiments may be made without departing from the nature, spirit or scope of the invention, the invention is not to be limited by or to those details, but only by the appended claims or their equivalents.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

REFERENCES

The following publications cited above are incorporated herein by reference:
1. Kuhn A T, Houghton R W. The design and optimization of industrial electrochemical cells. *Topics in Pure and Applied Electrochemistry*. SAEST, Karaikudi, India; 1979. p 133.
2. Robertson P M, Leudolph J, Maurer H. Improvement in rinsewater treatment by electrolysis. *Plat and Surf Fin*, 1983; 70: 48-52.
3. O'Keefee T J, Ettel, V A. The electrolytic recovery of metals from aqueous solution. Electrochem. Soc. Symp. Proceeding, Volume PV-87-7, 1987. p 103.
4. Weinginger J L. Electrochemical recovery of metals from wastewater. *A/ChE Symp Series*, 1987. p 79.
5. Tison R P. Copper recovery using a tumbled-bed electrochemical reactor. *J Electrochem Soc*, 1981; 128:317-322.
6. Fleishmann M, Oldfield J W, Tennakkoon, L. Electrochemical removal of copper ions by use of fluidized bed electrode. *J Appl Electrochem*, 1971; 1:103.
7. Bennion D N, Newman J. Electrochemical removal of copper ions from very dilute solutions. *J Appl Electrochem*, 1972; 2:113-122.
8. Robertson P M, Dossenbach O. Stirring by gas introduction and its application in the electroplating industry. *Oberflaeche-Surf* 1981; 22(9):282-287.
9. Holland, F S. The development of Eco-Cell process. *Chem Ind.*, 1978; July: 453-458.
10. Fleishmann M, King C J H, Oldfield J W, Plimley R E, Tennakkoon C L K.
11. Improvement in and relating to electrochemical cells. GB 1419246, 1971.

12. Fleishmann M, Jansson R E W, Marshall R J. Improvement in and relating to electrochemical cells. GB 1522872, 1976.
13. Tison R P, Howie B. Copper recovery from dilute solutions using a barrel plater. *Plat and Surf Fin*, 1984;71(9): 54-56.
14. Zhou C D, Chin D T. Copper recovery and cyanide destruction with a plating barrel cathode and a packed-bed anode. *Plat and Surf Fin*, 1993; 80(6): 69-77.
15. Zhou C D, Chin D T. Continuous electrolytic treatment of complex metal cyanides with a rotating barrel plater as the cathode and a packed-bed as the anode. *Plat and Surf Fin*, 1994; 81(6):70-78.
16. Chin D T, Zhou C D. Mass transfer and particle motion in a barrel plater. *J Electrochem Soc*, 1995; 142: 1933-1941.
17. Al-Shammari A A, Rahman S U, Chin D T. Copper recovery from wastewater using an electrochemical rotating barrel reactor. *J Appl Electrochem*, 2004; 34:447-453.
18. Ehara L, Miwa T, Kamaya M. Desalination process by improved multistage electrodialysis. U.S. Pat. No. 3,933,610 (1976).
19. Seto T, Ehara L, Komori R, Yamaguchi A, Miwa T. Seawater desalination by electrodialysis. *Desalination*, 1978; 25:1-7.
20. Cole M. Electrodialysis. U.S. Pat. No. 3,963,567 (1976).
21. Mani K N. Apparatus and process for electrodialysis of salts. U.S. Pat. No. 6,221,225 (2001).
22. Mani K N. Apparatus and process for electrodialysis of salts. U.S. Pat. No. 6,224,731 (201).
23. Genders J D, Hartsough D. Electrodialysis of multivalent metal ions. U.S. Pat. No. 6,712,946 (2004).
24. Resbeut S, Pourcelly G, Sandeaux R, Gavach, C. Electromembrane processes for waste treatment: electrodialysis applied to the demineralization of phenylalnine solutions. *Desalination*, 1998; 120:235-245.
25. Chaudhary A J, Donaldson J D, Grimes S M, Yasri N G. Separation of nickel from cobalt using elecrodialysis in the presence of EDTA. *J Appl Electrochem*, 2000; 30:439-445.
26. Grib H, Belhocine D, Lounici H, Pauss H, Mameri N. Desalting of phenylalanine solutions by electrolysis with ion-exchange membrane. *J Appl Electrochem*, 2000; 30:259-262.
27. Boateng D A D. Method for treating zinc-containing sulfate solution. U.S. Pat. No. 5,084,180 (1992).
28. Davis M. Use advanced methods to treat wastewater. *Hydrocarbon Proc*, 1994; 73:43-46.
29. Chin K K, Ong S L. Water conservation through reclamation of sewage for reuse. Proceedings of 22$^{nd}$ Annual Conf. Integrated Water Resource Planning for 21$^{st}$ Century, Cambridge, USA, 1995. pp 73-76.
30. Bal A S, Vaidya A N. Application of membrane technology in wastewater management. *Chem Eng World*, (1998); 33:5.
31. Hryn J N, Sreenivasarao K. Method and apparatus for electrodialysis processing. U.S. Pat. No. 6,461,491 (2002).
32. Emery N, Woodward R, Whitehead P. Electrodialysis apparatus. U.S. Pat. No. 6,402,917 (2002).
33. Gorzynski M. Electrodialysis Treatment. U.S. Pat. No. 5,643,430 (1997).
34. Gorzynski M. Electrodialysis Treatment. U.S. Pat. No. 5,876,579 (1999).
35. Adiga M. Plating wastewater treatment and metal recovery system. U.S. Pat. No. 6,162,361 (2000).
36. Kuo J. Wastewater treatment system with an ion-selective membrane. U.S. patent application No. 0,166,806 (2002).

What is claimed as new and useful and desired to be secured by Letters Patent is:

1. A process for recovering oxygen, hydrogen, metal ions, metals, acid and treated water from waste water effluent from metallurgical and process industries, said process comprising,
    (a) providing an apparatus comprising a plurality of cells, wherein each of said cells comprises a wastewater chamber having an inlet and an outlet, a catholyte chamber, and an anolyte chamber; an anion exchange membrane disposed between said anolyte chamber having an inlet and an outlet and wherein each of said cells is separated from one another by an inert, non-porous and impervious partition and said wastewater chamber; a cation exchange membrane disposed between said catholyte chamber and said wastewater chamber; an anode disposed in said anolyte chamber; and a cathode disposed in said catholyte chamber;
    (b) providing an anolyte in said anolyte chamber wherein said anolyte is hydrochloric acid or sulfuric acid;
    (c) providing a catholyte in said catholyte chamber wherein said catholyte is KOH;
    (d) providing waste water to be treated in said wastewater chamber; said water comprising anions and cations including metal ions selected from the group consisting of camion, chromium, copper, lead, gold, nickel, silver and zinc ions and wherein hydrogen is generated at said cathode, wherein the concentration of H$^+$ and the anions in the anolyte are increased to thereby concentrate dilute acid as a by product, wherein dilute acid is fed into said anolyte chambers, and concentrated acid is recovered from said anolyte chamber after the potential difference is applied, wherein oxygen is recovered from said anolyte chamber after the potential difference is applied, wherein hydrogen is recovered from said catholyte chamber after the potential difference is applied and wherein said metal ions are recovered in metallic form at said cathode;
    (e) applying a potential difference across said anode and cathode;
    (f) allowing said anions to diffuse through said anion exchange membrane;
    (g) allowing said cations to diffuse through said cation exchange membrane;
    (h) recovering treated water from said catholyte chamber;
    (i) recovering metal ions in metallic form from said cathode; and
    wherein the concentration of metal ions in said water to be treated is reduced from greater than 1,000 ppm to a few ppm after the potential difference is applied.

2. A process according to claim 1 wherein said process is carried out as a batch process.

3. A process according to claim 1 wherein said process is carried out as a continuous process.

\* \* \* \* \*